US006856353B1

(12) United States Patent
Misawa

(10) Patent No.: US 6,856,353 B1
(45) Date of Patent: Feb. 15, 2005

(54) DIGITAL ELECTRONIC STILL CAMERA AND REMOVABLE MEMORY CARD THEREFOR

(75) Inventor: Takeshi Misawa, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/392,445

(22) Filed: Sep. 9, 1999

(30) Foreign Application Priority Data

Sep. 14, 1998 (JP) .......................................... 10-260258

(51) Int. Cl.[7] ................................................ H04N 5/222
(52) U.S. Cl. ................................ 348/333.07; 348/231.7
(58) Field of Search ......................... 348/231.7, 333.07, 348/333.01, 333.02, 333.03, 333.04, 333.05, 333.06, 333.08, 333.09, 333.1, 333.11, 333.12, 333.13

(56) References Cited

U.S. PATENT DOCUMENTS 4,887,161 A * 12/1989 Watanabe et al. ...... 348/333.02
5,016,223 A * 5/1991 Kimura et al. .............. 365/229
5,490,117 A * 2/1996 Oda et al. ................... 365/226
5,546,590 A * 8/1996 Pierce ........................ 713/323
5,550,938 A * 8/1996 Hayakawa et al. ......... 382/313
5,668,695 A * 9/1997 Nakamura et al. .......... 361/683
5,950,013 A * 9/1999 Yoshimura et al. ............ 710/5
6,072,465 A * 6/2000 Maeda et al. ............... 345/156
6,587,140 B2 * 7/2003 No ........................ 348/333.02
2003/0038880 A1 * 2/2003 No ............................ 348/373
2003/0128399 A1 * 7/2003 Chino et al. ................ 358/296

FOREIGN PATENT DOCUMENTS

JP 063053772 A * 8/1986 ........... G11B/23/30

* cited by examiner

*Primary Examiner*—Wendy R. Garber
*Assistant Examiner*—Jason Whipkey
(74) *Attorney, Agent, or Firm*—Birch, Stewart, Kolasch & Birch, LLP.

(57) ABSTRACT

A memory card having a liquid crystal display device is reduced in thickness. To this end, the back side of a liquid crystal display panel is provided with a white diffusing plate and the memory card is not provided with a light source for backlighting. A digital electronic still camera, into which the memory card is removably inserted, is provided with a light source for backlighting. When the memory card has been inserted into the digital camera, the transmission-type liquid crystal panel is illuminated using the light source of the camera. Thus an image displayed on the liquid crystal display device of the memory card can be viewed even though the memory card does not have a light source for backlighting.

22 Claims, 8 Drawing Sheets

1
2
3
IMAGE NO.5
ON
OFF
4
5
6
7
IMAGE
MEMORY

DIGITAL ELECTRONIC STILL CAMERA AND REMOVABLE MEMORY CARD THEREFOR

BACKGROUND OF THE INVENTION

1. Field of the Invention

This invention relates to a memory card (inclusive of media referred to as memory cartridges and digital film) for storing image data, and to a digital electronic still camera into which such a memory card can be removably inserted.

2. Description of the Related Art

Internal semiconductor memories, removable memory cards and the like are used as the storage media of digital electronic still cameras. Image data obtained by sensing the image of a subject using a digital electronic still camera is stored on storage media such as the internal semiconductor memory or memory card. Because they are easy to access, memory cards are used as the storage media of digital electronic still cameras comparatively frequently.

SUMMARY OF THE INVENTION

Once image data has been stored on a memory card, the content of the image data cannot be ascertained unless the image data is read out of the card. It has been contemplated, therefore, to provide the memory card with a display device to display an image. Providing a memory card with a display device, however, makes it difficult to produce a thin card.

Accordingly, an object of the present invention is to make it possible to obtain a comparatively thin memory card even if the card is provided with a display device.

Another object of the present invention is to provide a digital electronic still camera into which such a memory card can be removably inserted.

A memory card in accordance with the present invention is capable for being removably inserted into an image processing apparatus which outputs image data representing an image, the memory card having an image memory for storing image data, which is output from the image processing apparatus, applied thereto as an input, and a liquid crystal display device for displaying an image represented by the image data that has been stored in the image memory, wherein the memory card has a case which is open at a location corresponding to a back side of the liquid crystal display device, and the liquid crystal display device is a transmission-type liquid crystal panel for displaying an image.

The memory card preferably further includes a diffusion plate for diffusing light and illuminating the back side of the transmission-type liquid crystal panel with the diffused light.

In the memory card according to the present invention, a light source for backlighting the transmission-type liquid crystal panel is not provided. Since there is no light source for backlighting, the memory card can be reduced in thickness.

When an image is viewed by being displayed on the transmission-type liquid crystal panel of the memory card, the memory card is held in one's hand and illuminated by artificial light such as a lamp or by natural light such as sunlight.

A digital electronic still camera having a light source for illuminating the transmission-type liquid crystal panel with light from its back side may be constructed, and it may be so arranged that the above-described memory card is inserted into the camera. An image displayed on the transmission-type liquid crystal panel of the memory card can be viewed using the light source with which the camera is equipped.

The memory card may further be provided with a power supply for displaying an image on the liquid crystal display device, an insertion detection device for detecting whether the memory card has been connected to the image processing apparatus by insertion therein, and a power-supply controller for turning the power supply on or off in response to detection of insertion of the memory card into the image processing apparatus by the insertion detection device.

When power is supplied to the memory card by the image processing apparatus as a result of detection of insertion of the memory card into the image processing apparatus, the power supply incorporated within the memory card is turned off. This makes it possible to suppress consumption of power by the memory card.

In a case where the image processing apparatus is a digital electronic still camera and the transmission-type liquid crystal panel of the memory card is exposed to the exterior of the camera, the power supply of the memory card is turned on by the image processing apparatus as a result of detection of insertion of the card into the image processing apparatus. Merely inserting the memory card into the image processing apparatus results in display of an image represented by the image data that has been stored on the memory card.

In this case, and by way of example, the digital electronic still camera would be provided with a memory-card insertion detection device for detecting whether the memory card has been inserted into the camera, and a command controller for applying to the memory card a command for turning the power supply on or off in response to detection of insertion of the memory card by the memory-card insertion detection device.

Thus, in response to a command output from the digital electronic still camera, control is performed to turn the power supply of the memory card on or off.

The memory card may be provided with a command input device for inputting a power-on command applied by the image processing apparatus, a power-on controller turning the power supply on in response to input of the power-on command from the command input device.

Thus, the power supply of the memory card can be turned on or off under the control of the image processing apparatus.

The memory card may further be provided with a charging circuit, which is supplied with a voltage from the image processing apparatus in response to detection of insertion of the memory card into the image processing apparatus by the insertion detection device, for charging the power supply by this supplied voltage.

Even if memory card power runs low, therefore, storage of image data in the memory card can continue because the power supply of the memory card is charged.

By way of example, the above-described digital electronic still camera would be provided with a memory-card insertion detection device for detecting whether the memory card has been inserted into the camera, and a charging controller for charging the power supply in response to detection of insertion of the memory card by the memory-card insertion detection device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
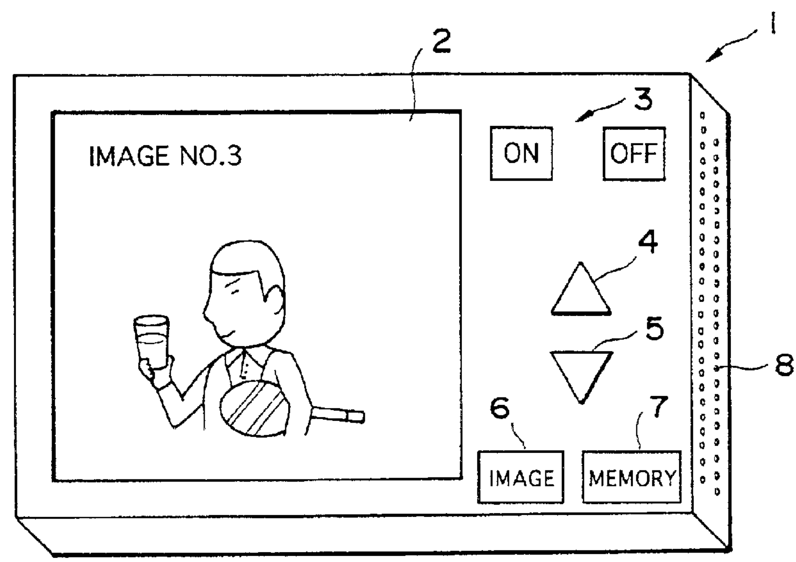
FIGS. 1 and 2 are perspective views of a memory card according to an embodiment of the present invention.
Figure 2:
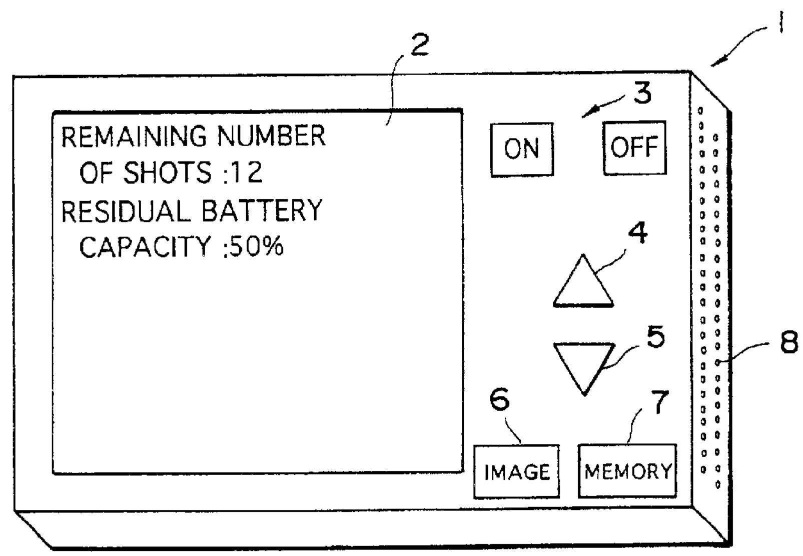

FIGS. 1 and 2 are perspective views of a memory card according to an embodiment of the present invention.

A memory card 1 is capable for being removably inserted into a digital electronic still camera (referred to also as a "digital camera" below). Image data obtained by sensing the image of a subject using the digital camera is recorded on the memory card.

A liquid crystal display device 2 has a display screen exposed to view on the front side of the memory card 1 substantially over its entire area. Power-supply control switches 3 for controlling the memory card 1 to turn the card on and off are provided at the right side of the liquid crystal display device 2. The power-supply control switches 3 include a switch for turning the power supply on and a switch for turning the power supply off.

Next-frame and previous-frame switches 4, 5, respectively, are provided below the power-supply control switches 3. An image display switch 6 and a memory-information display switch 7 are provided below the previous-frame switch 5. A connection terminal 8 for electrically connecting the memory card 1 and the digital camera is formed on the right side end of the memory card 1.

An image represented by image data that has been stored on the memory card 1 can be displayed on the liquid crystal display device 2, as shown in FIG. 1.

The image represented by the image data that has been stored on the memory card 1 is displayed on the display screen of the liquid crystal display device 2 by closing the ON switch of the power-supply control switches 3 of the memory card 1. (For example, the image represented by the image data stored on the memory card 1 last is displayed. It is of course permissible to display the image represented by the image data stored first, or to display some other image.) By pressing the next-frame switch 4, the image of the frame that follows the image being displayed on the liquid crystal display device 2 is displayed on the liquid crystal display device 2. By pressing the previous-frame switch 5, the image of the frame preceding the image being displayed on the liquid crystal display device 2 is displayed on the liquid crystal display device 2. The image number is also displayed on the liquid crystal display device 2.

By pressing the memory-information display switch 7, information regarding a semiconductor memory incorporated in the memory card 1 is displayed on the liquid crystal display device 2, as shown in FIG. 2. In the example of FIG. 2, the remaining number of images that can be stored on the memory card 1 and the amount of remaining battery capacity are being displayed on the liquid crystal display device 2.

By pressing the image display switch 6, an image is displayed on the liquid crystal display device 2 again, as shown in FIG. 1.

Figure 3:
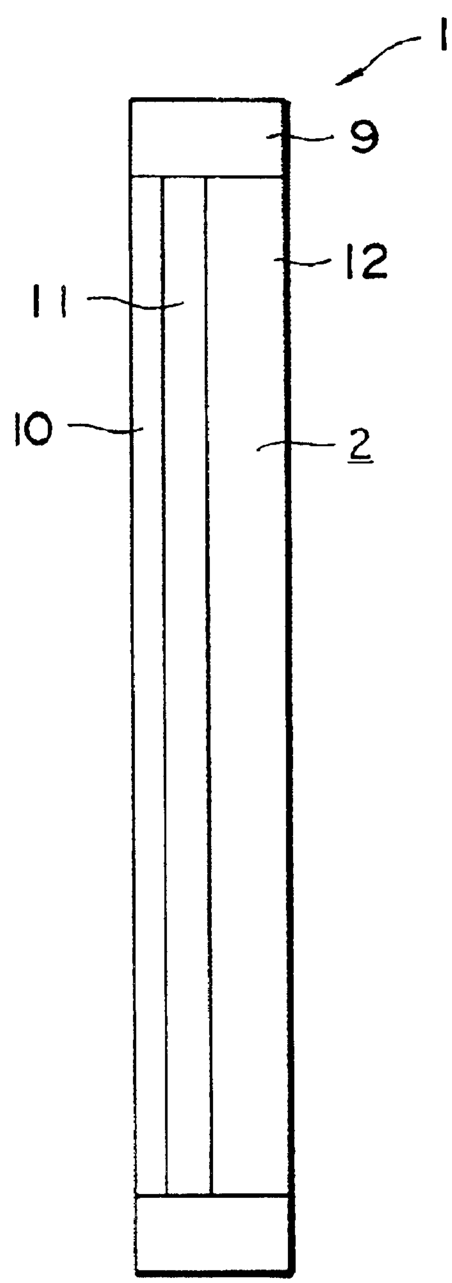
FIG. 3 is a sectional view of the memory card.

FIG. 3 is a cross-sectional view of the memory card 1. Hatching is deleted in order to facilitate understanding of the card.

The liquid crystal display device 2 uses a transmission-type liquid crystal panel 11. The front side of the transmission-type liquid crystal panel 11 is provided with a surface-protecting glass 10 for protecting the transmission-type liquid crystal panel 11. The back side of the transmission-type liquid crystal panel 11 is provided with a white diffusing plate 12 for diffusing light and applying the diffused light to the back side of the transmission-type liquid crystal panel 11. The surface-protecting glass 10, transmission-type liquid crystal panel 11 and white diffusing plate 12 construct the liquid crystal display device 2 and are fixedly accommodated by a case 9 of the memory card 1.

The liquid crystal display device 2 is not provided with a light source for backlighting. The front and back sides of the case 9 of the memory card 1 at the location where the liquid crystal display device 2 is provided are open, with the back side of the white diffusing plate 12 being exposed externally of the memory card 1.

Figure 4:
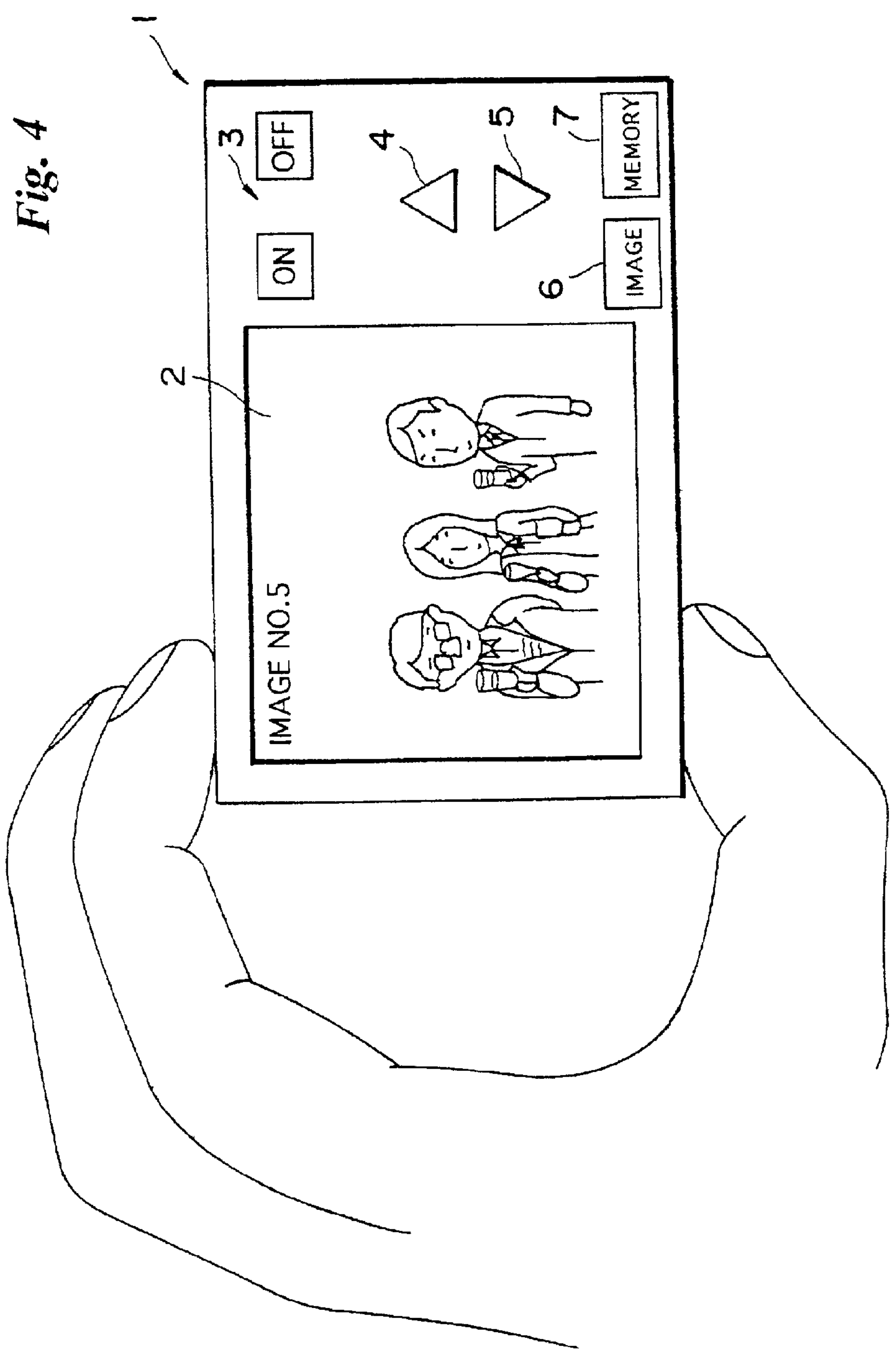
FIG. 4 shows the manner in which an image being displayed on the memory card is viewed.

FIG. 4 illustrates the manner in which an image displayed on the display screen of the liquid crystal display device 2 of the memory card 1 is viewed.

As mentioned above, the liquid crystal display device 2 utilizes the transmission-type liquid crystal panel 11 and is not provided with a light source for backlighting. When the image being displayed on the liquid crystal display device 2 is viewed, therefore, the memory card 1 is held with the back side of the transmission-type liquid crystal panel 11 faced toward the sun (or illumination). The light from the sun (or the light from the illumination) is diffused by the white diffusing plate 12 and uniformly illuminates the back side of the transmission-type liquid crystal panel 11. Thus, even though the memory card 1 does not have a light source for backlighting, the image being displayed on the liquid crystal display device 2 can be viewed.

In the example set forth above, the liquid crystal display device 2 of the memory card 1 includes the white diffusing plate 12. However, the white diffusing plate 12 need not necessarily be provided.

Figure 5:
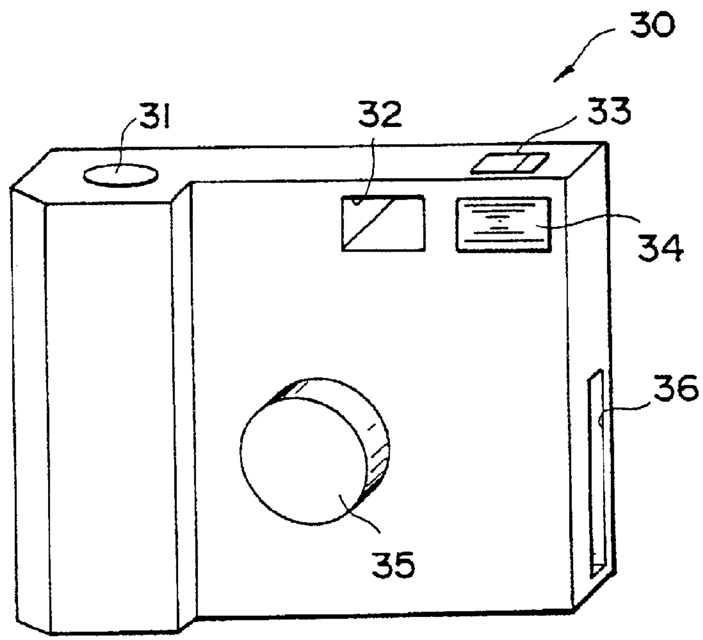
FIGS. 5 and 6 are perspective views of a digital electronic still camera according to an embodiment of the present invention.
Figure 6:
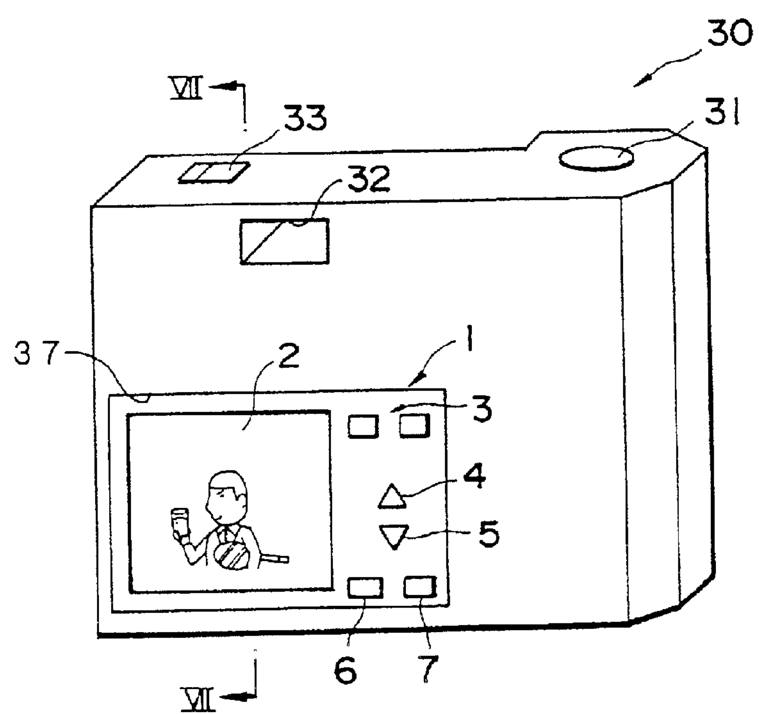

FIGS. 5 and 6 illustrate a digital electronic still camera 30 into which the memory card 1 is capable for being removably inserted. FIG. 5 is a perspective view as seen from the front, and FIG. 6 is a perspective view as seen from that rear.

As shown in FIG. 5, the top of the digital camera 30 is formed to have a shutter button 31 on the left side thereof and a power-supply switch 33 on the right side thereof. The power-supply switch 33 is for controlling the digital camera 30 so as to turn its power supply on and off.

A taking lens 35 is exposed substantially at the center of the digital camera 30 on the front side thereof. An optical viewfinder 32 and a strobe 34 are provided above the taking lens 35.

A slot 36 for inserting the memory card 1 is provided in the right side of the digital camera 30.

As shown in FIG. 6, a window 37 is formed in the back side of the digital camera 30 at the lower left. When the memory card 1 is inserted from the slot 36 formed in the side of the digital camera 30, the liquid crystal display device 2 of the memory card 1 is exposed from the window 37 of the digital camera 30. With the memory card 1 inserted into the digital camera 30, an image being displayed on the liquid crystal display device 2 of the memory card 1 can be viewed.

Figure 7:
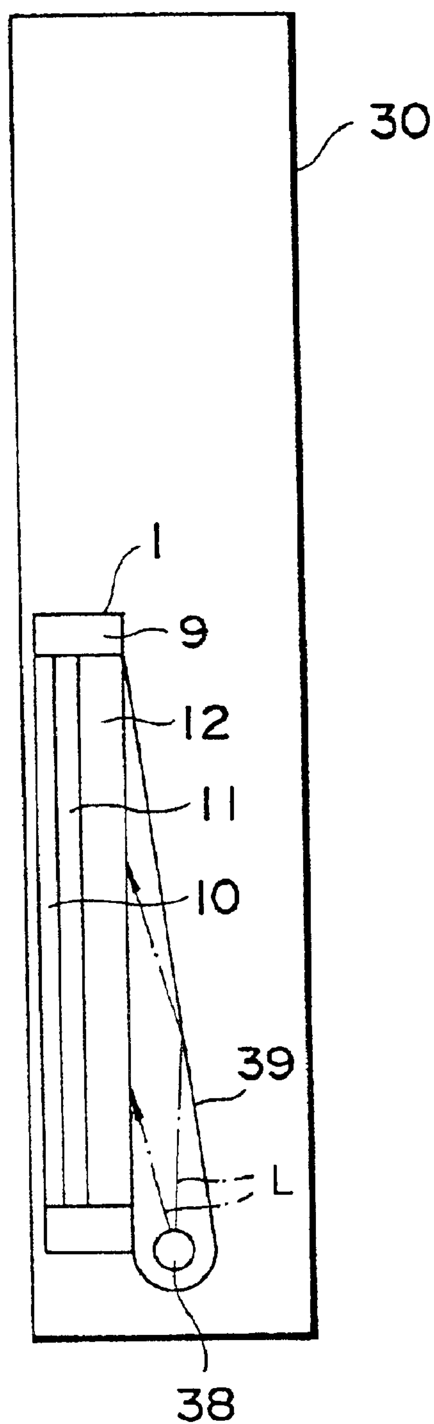
FIG. 7 is a sectional view of the camera taken along line VII—VII of FIG. 6.

FIG. 7 is a sectional view taken along line VII—VII of FIG. 6. Hatching is deleted in FIG. 7.

The digital camera 30 includes a light source 38 for backlighting. When the memory card 1 has been inserted into the digital camera 30, the light source 38 illuminates the back side of the white diffusing plate 12 constructing the liquid crystal display device 2 of the memory card 1. A reflecting plate 39 is provided in order to introduce the light emission from the light source 38 to the back side of the white diffusing plate 12 in an efficient manner.

The liquid crystal display device 2 of the memory card 1 does not include a light source for backlighting. However, when the memory card 1 has been inserted into the digital camera 30, the transmission-type liquid crystal panel 11 is illuminated (with light L) by the light source 38 provided for backlighting in the digital camera 30. With the memory card 1 inserted into the digital camera 30, therefore, an image displayed on the liquid crystal display device 2 of the memory card 1 can be seen.

Figure 8:
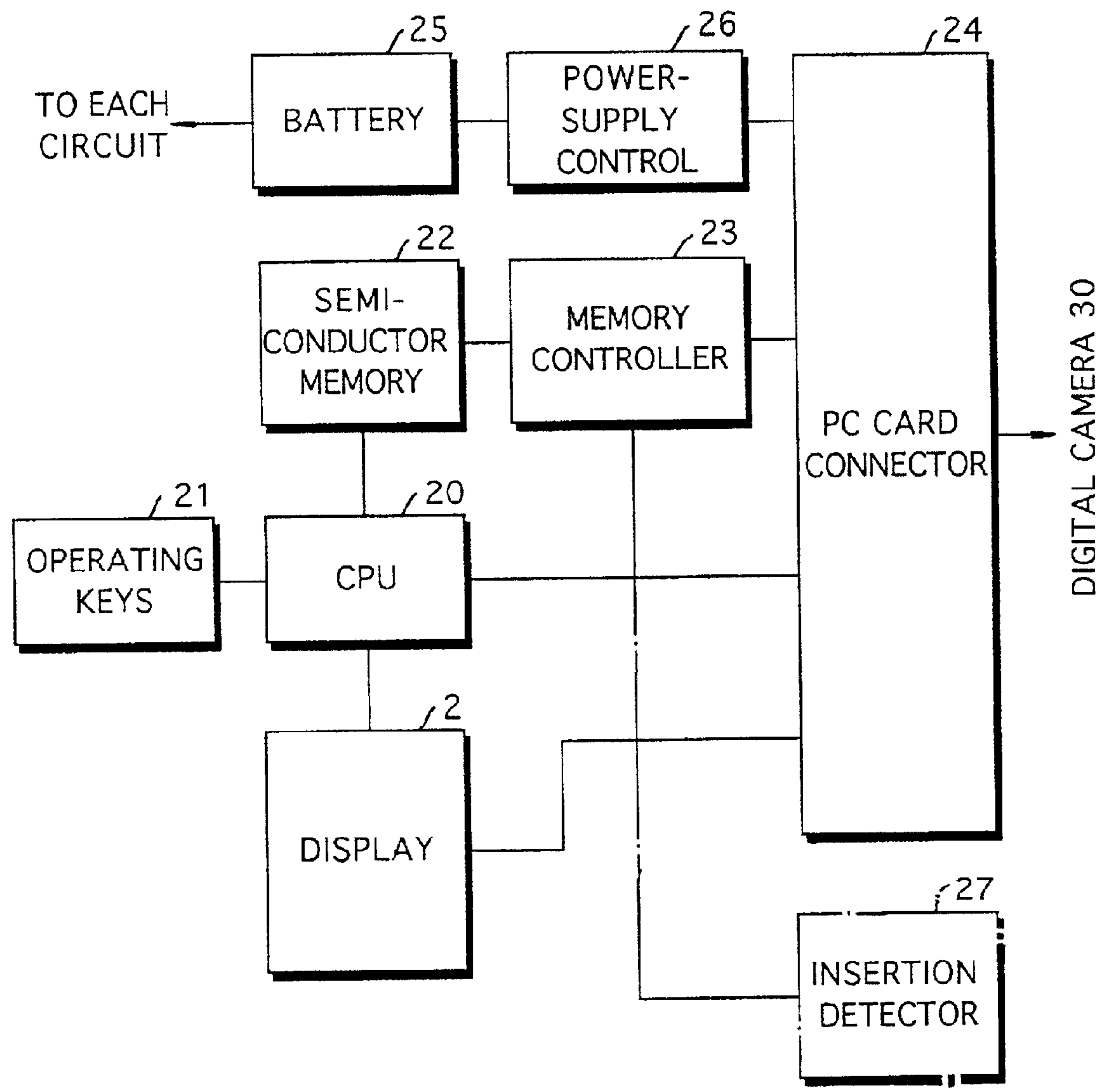
FIG. 8 is a block diagram showing the electrical construction of the memory card.
Figure 9:
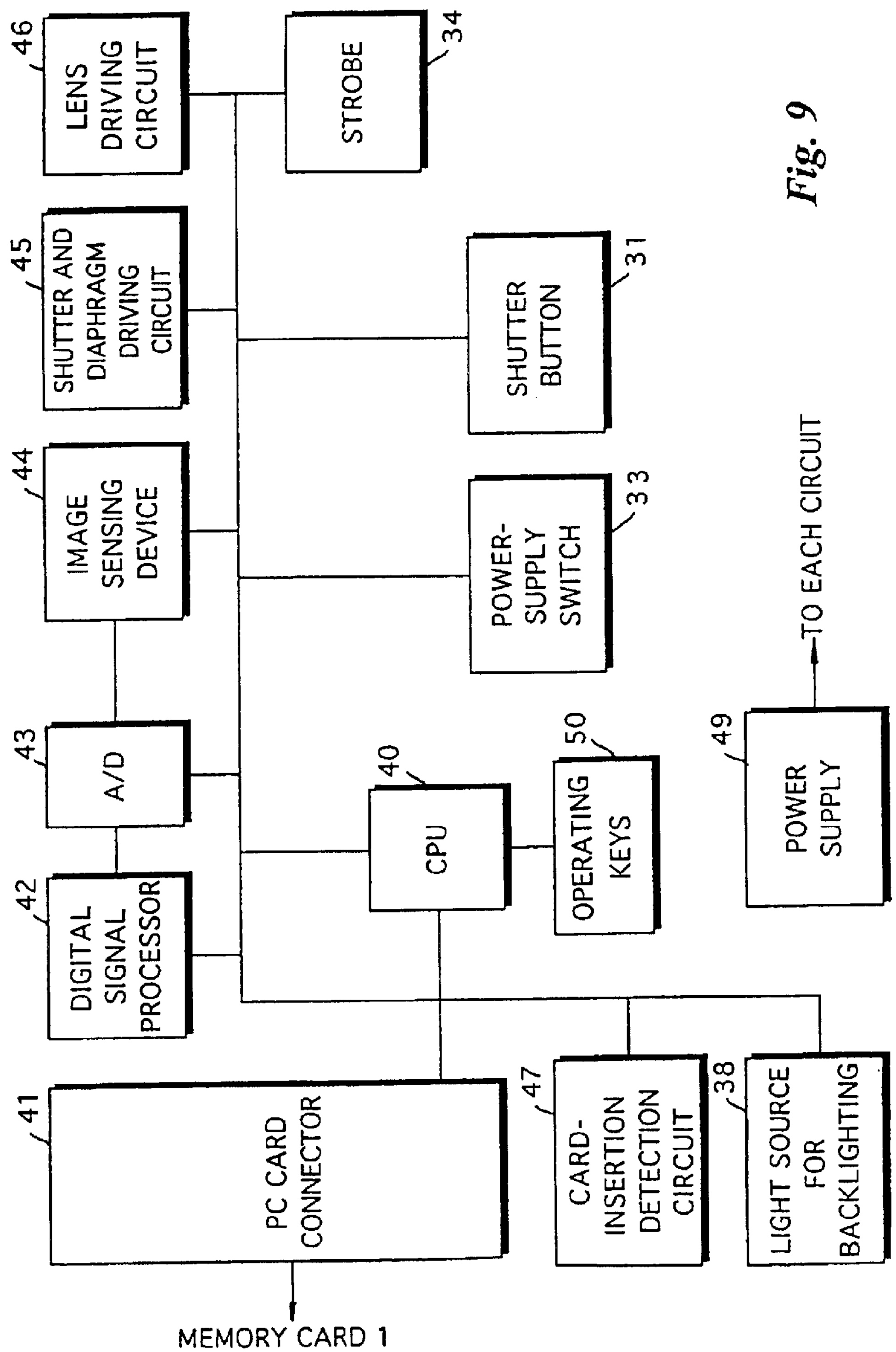
FIG. 9 is a block diagram showing the electrical construction of the digital electronic still camera.

FIG. 8 is a block diagram showing the electrical construction of the memory card 1, and FIG. 9 is a block diagram showing the electrical construction of the digital camera.

The overall operation of the memory card 1 is supervised by a CPU 20. Signals representing the settings of operating keys (the above-mentioned power-supply control switches 3, next-frame switch 4, previous-frame switch 5, image display switch 6 and memory-information display switch 7) 21 are input to the CPU 20.

A removable battery (charging battery) 25 has been loaded in the memory card 1. The battery 25 supplies power to each circuit constructing the memory card 1. The voltage of the battery 25 is sensed by a power-supply control circuit 26. The remaining capacity of the battery is calculated by the CPU 20 based upon the voltage sensed and the calculated capacity is displayed on the liquid crystal display device 2. The battery 25 is charged by the power-supply control circuit 26.

The memory card 1 includes a semiconductor memory 22 for storing image data. The readout of data from and the writing of data to the semiconductor memory 22 is controlled by a memory controller 23. The image data that has been stored in the semiconductor memory 22 is read out by the memory controller 23 and applied to the liquid crystal display device 2, whereby an image is displayed on the liquid crystal display device 2.

Also stored in the semiconductor memory 22 is data representing the memory capacity of the semiconductor memory 22, the amount of memory already being used and the amount of remaining memory in which data is capable for being stored. The amount of data in image data representing one frame of an image is predetermined, and the number of pictures that can be taken is calculated by the CPU 20 based upon the amount of memory remaining. The number calculated is displayed on the liquid crystal display device 2, as shown in FIG. 2.

The memory card 1 includes a PC-card connector 24. The memory card 1 and digital camera 30 are electrically connected by the connector 24 via the connection terminal 8.

The memory card 1 may be provided with an insertion detection circuit 27 for detecting that the card has been inserted into the digital camera 30. The power supply of the memory card can be controlled so as to be turned on and off by detecting, through the insertion detection circuit 27, that the card has been inserted into the digital camera 30. By turning on the power supply of the memory card 1 through such control when the memory card 1 is inserted into the digital camera 30, an image can be displayed merely by the insertion of the memory card 1 into the digital camera 30. Conversely, by turning off the power supply of the memory card 1 through such control when the memory card 1 is inserted into the digital camera 30, consumption of the battery 25 can be suppressed. In such case the power would be supplied to the memory card 1 from the digital camera 30.

With reference to FIG. 9, the overall operation of the digital camera 30 is supervised by the CPU 40.

The digital camera 30 includes a power supply 49 by which each of the circuits of the digital camera 30 are supplied with power.

The taking lens 35 is driven by a lens driving circuit 46 so that the image of a subject is formed on the light-receiving surface of an image sensing device 44. A shutter and diaphragm (neither of which are shown) are driven by a shutter/diaphragm driving circuit 45 to control shutter speed and aperture.

When the image of a subject is sensed by the image sensing device 44, the latter outputs a video signal representing the image of the subject. The video signal is input to an analog/digital conversion circuit 43, whereby the signal is converted to digital image data. The digital image data is applied to a digital-signal processing circuit 42, which subjects the digital image data to signal processing such as a color balance correction and gamma correction.

The signal output by the digital-signal processing circuit 42 is applied to the memory card 1, which has been connected the PC-card connector 41, and is input to the semiconductor memory 22 so as to be stored there. By reading the image data out of the semiconductor memory 22, the image of the subject obtained by photography can be displayed on the display screen of the liquid crystal display device 2 of the memory card 1.

The digital camera 30 is provided with a card-insertion detection circuit 47 for detecting that the memory card 1 has been inserted. If insertion of the memory card 1 into the digital camera 30 is detected by the card-insertion detection circuit 47, each circuit of the memory card 1 is supplied with the voltage of the power supply 49 included in the digital camera 30. The power supply of the memory card 1 is controlled so as to be turned off, and the supply of power from the battery 25 loaded in the memory card 1 is controlled by the power-supply control circuit 26 in such a manner that supply is stopped. This makes it possible to suppress needless consumption of the battery 25 loaded in memory card 1.

An arrangement may be adopted in which the power supply of the memory card 1 is turned on when insertion of the memory card 1 into the digital camera 30 has been detected by the card-insertion detection circuit 47. When the memory card 1 is inserted into the digital camera 30, an image would be displayed on the liquid crystal display device 2 of the memory card 1 so that the image could be viewed.

Further, an arrangement may be adopted in which the digital camera 30 is provided with various operating keys 50. A signal representing setting of the operating keys 50 enters the CPU 40. It is also possible to adopt an arrangement in which the power supply of the memory card 1 is controlled so as to be turned on and off using the operating keys 50. It goes without saying that in a case where the power supply of the memory card 1 is on/off controlled, a signal for controlling the on/off state of the power supply would be input to the CPU 20 of the memory card 1 from the digital camera 30.

Further, an arrangement may be adopted in which operating the operating keys 50 of the digital camera 30 applies the voltage from the power supply 49 of the digital camera 30 to the battery 25 loaded in the memory card 1, thereby charging the battery 25.

The image data that has been stored in the memory card 1 can be erased by operating the operating keys 50.

Figure 10:
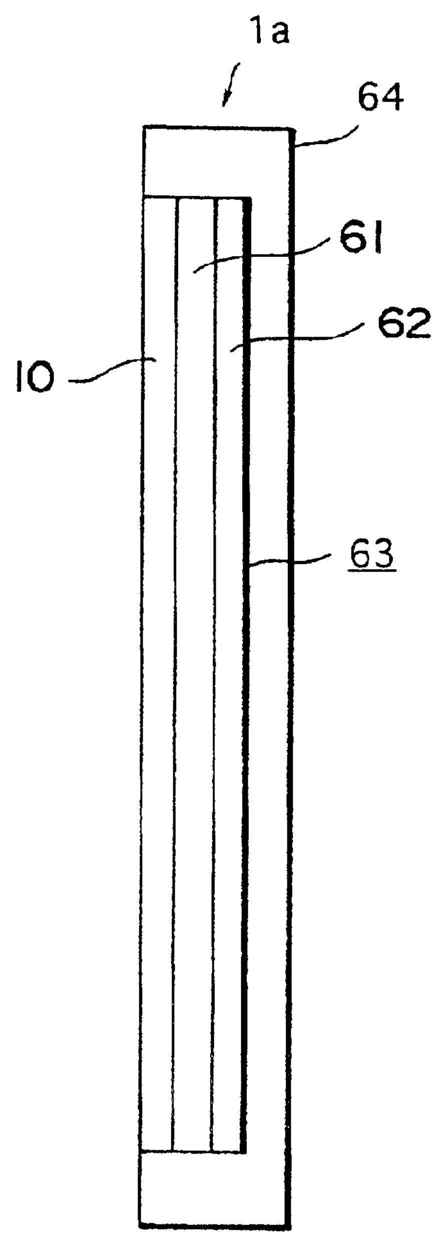
FIG. 10 is a sectional of a memory card according to another embodiment of the present invention.

FIG. 10 illustrates another embodiment of the present invention and is a sectional view of a memory card 1*a*. No hatching is shown in FIG. 10.

Whereas the memory card 1 of the foregoing embodiment uses the transmission-type liquid crystal panel 11, as shown in FIG. 3, the memory card 1*a* illustrated in FIG. 10 employs a reflection-type liquid crystal panel 61. A reflecting plate 63 is secured to the back side of the reflection-type liquid crystal panel 61 via a white diffusing plate 62. The back side of the reflecting plate 63 is closed by a case 64 of the memory card 1*a*.

Light that has entered the reflection-type liquid crystal panel 61 from the front side thereof via the surface-protecting glass 10 is diffused by the white diffusing plate 62 via the reflection-type liquid crystal panel 61 and illuminates the reflecting plate 63. This light is reflected by the reflecting plate 63. As a result, an image displayed on the reflection-type liquid crystal panel 61 can be viewed.

As many apparently widely different embodiments of the present invention can be made without departing from the spirit and scope thereof, it is to be understood that the invention is not limited to the specific embodiments thereof except as defined in the appended claims.

What is claimed is:

1. A digital image processing apparatus into which a memory card is removably inserted, said memory card including an image memory for storing image data representing an image, a transmission-type display panel for displaying an image represented by the image data that has been stored in said image memory, and a case for accommodating said image memory and said display panel, said case having an opening at a location corresponding to a back side of said transmission-type display panel, said image processing apparatus comprising:

an electronic image receiving element;

a processing circuit for processing said image for storage;

a receiving area receiving said memory card; and a light source underlying said receiving area for illuminating said transmission-type display panel from the back side thereof.

2. The image processing apparatus according to claim 1, wherein said memory card has a power supply for driving said display panel, and said image processing apparatus further includes:

a memory-card insertion detection device for detecting whether said memory card has been inserted into the receiving area of said image processing apparatus; and a command controller for applying to said memory card a command for controlling said memory card to turn the power supply on or off in response to detection of insertion of said memory card by said memory-card insertion detection device.

3. The camera according to claim 1, wherein said memory card has a chargeable power supply for driving said display panel, and said image processing apparatus further includes:

a memory-card insertion detection device for detecting whether said memory card has been inserted into the receiving area of said image processing apparatus; and a charging controller for performing control so as to charge said power supply in response to detection of insertion of said memory card by said memory-card insertion detection device.

4. The image processing apparatus of claim 1, wherein said receiving area is a slot for receiving the memory card.

5. The image processing apparatus of claim 1, wherein said apparatus is a digital electronic camera.

6. The image processing apparatus of claim 5, wherein said camera is a digital still camera.

7. The image processing apparatus of claim 1, wherein said display panel is a liquid crystal panel.

8. A memory card removably inserted into an image processing apparatus which outputs image data representing an image, comprising:

an image memory for storing image data, which is output from the image processing apparatus, applied thereto as an input;

a liquid crystal display device for displaying an image represented by the image data that has been stored in said image memory; and a case for accommodating said image memory and said liquid crystal display device, said case having an opening at a location corresponding to a back side of said liquid crystal display device for receiving light to illuminate said liquid crystal display device, said received light being emitted from said image processing apparatus when said case is inserted therein;

said liquid crystal display device being a transmission-type liquid crystal panel.

9. The memory card according to claim 8, further comprising a diffusion plate provided in said opening for diffusing light and illuminating the back side of said transmission-type liquid crystal panel with the diffused light.

10. The memory card according to claim 8, further comprising:

a power supply for supplying power to enable said liquid crystal display device to display an image thereon;

an attachment detecting device for detecting whether said memory card has been connected to the image processing apparatus; and a power-off control device for turning said power supply off in response to detection of attachment of said memory card to the image processing apparatus by said attachment detection device.

11. The memory card according to claim 10, further comprising a charging circuit, which is supplied with a voltage from the image processing apparatus in response to detection of insertion of said memory card into the image processing apparatus by said insertion detection device, for charging said power supply by this supplied voltage.

12. The memory card of claim 10, wherein attachment of said memory card is accomplished by insertion of said memory card into a slot provided in the image processing apparatus intended for use therewith, said attachment detection device detecting insertion of said memory card into the slot of said image processing apparatus.

13. The memory card according to claim 8, further comprising:

a power supply for displaying an image on said liquid crystal display device;

an insertion detecting device for detecting whether said memory card has been connected to the image processing apparatus by being inserted therein; and a power-on controller for turning said power supply on in response to detection of insertion of said memory card into the image processing apparatus by said insertion detection device.

14. The memory card according to claim 13, further comprising a command input device for inputting a power-on command provided by the image processing apparatus;

said power-on controller turning said power supply on in response to input of the power-on command from said command input device.

15. The memory card according to claim 13, further comprising a charging circuit, which is supplied with a voltage from the image processing apparatus in response to detection of insertion of said memory card into the image processing apparatus by said insertion detection device, for charging said power supply by this supplied voltage.

16. The memory card of claim 8, wherein said memory card is viewable through illumination provided through the opening in said case.

17. The memory card of claim 8, wherein said image processing apparatus is a digital electronic camera.

18. A method of using a memory card provided with a display with an imaging device comprising:

using the display to display the contents of the memory card while said card is unattached to said imaging device;

providing an imaging device with a memory card receiving area having a memory card illuminating device associated therewith;

selectively attaching said memory card to the imaging device; and using the display of the memory card as a display of the imaging device while said memory card is attached to said imaging device by illuminating said display of the memory card using said memory card illuminating device.

19. The method of claim 18, wherein said imaging device is a digital electronic camera.

20. The method of claim 18, wherein said imaging device includes a recess for receiving the memory card, said memory card being selectively inserted in said recess to attach to said imaging device and function as display and memory therefore.

21. The method of claim 20, wherein said memory card includes a memory for storing a image data.

22. The method of claim 21, wherein said imaging device is a digital electronic camera.

* * * * *